Patented Mar. 4, 1930

1,749,463

UNITED STATES PATENT OFFICE

HEINRICH BERTSCH, OF CHEMNITZ, GERMANY, ASSIGNOR TO H. TH. BÖHME A. G., OF CHEMNITZ, GERMANY, A CORPORATION OF GERMANY

PROCESS FOR OBTAINING SULPHONATION PRODUCTS FROM POLYMERIZED FATS OR OILS OR THE ACIDS THEREOF

No Drawing. Application filed September 12, 1927, Serial No. 219,169, and in Germany July 8, 1926.

This invention relates to a process for obtaining sulphonation products from polymerized fatty materials, including fats, or else, fatty acids and their esters.

Products like Turkey red oil, but with improved properties, are obtainable by the sulphonation of fats or fatty acids by treatment with anhydrous organic acids, their anhydrides or chlorides, the last named compounds being defined hereinafter as organic acid radical compounds.

It has been found that such concentrated organic acids or their anhydrides or chlorides combine with the water forming in the sulphonation reaction so that the reversal of the sulphonation reaction (re-saponification) is retarded and in this way the product is improved and the yield of effective constituents of the finished products is increased.

An important object of this invention is therefore to obtain products possessing even more valuable properties than those hitherto obtained. In particular, the object is to increase the resistance of the products against salts and acids or to improve the stability of such products in the presence of such salts or acids. Also, it is the object of the invention to increase the viscosity and lubricating and softening properties of such products.

Objects as aforesaid are achieved if the fats and fatty acids are substituted by their polymerization products, these latter being sulphonated and simultaneously treated with anhydrous organic acids, their anhydrides or chlorides.

For instance, the polymerization products may be those which result from the heating of fatty oils. As an example, a substance obtained by the dry heating of castor oil may be employed.

Several methods of carrying out the process are described in the following examples:—

*Example I.*—100 kgs. of a product obtained by dry distillation of castor oil at 270–280° up to a weight loss of 10%, and which is soluble in petroleum in contrast to castor oil, are mixed with 30 kgs. of acetic acid anhydride and the mixture is then treated in the usual manner with sulfuric acid. When the reaction is complete, acetic acid and excess sulfuric acid are removed by washing with small amounts of water.

*Example II.*—A mixture of 100 kg. of the polymerizate obtained by heating castor oil to 270–280° with up to 10% loss in weight and 30 kg. of acetic anhydride is sulphonated with 100 kg. of concentrated sulfuric acid with the temperature kept at 10° C. The reaction mixture formed is washed in the cold with about twice that amount of concentrated Glauber's salt solution and the sulphonate after removal of the wash water is neutralized with soda liquor.

*Example III.*—A mixture of 100 kg. of diricinoleic acid obtained by heating for several hours ricinoleic acid at 150° and 100 kg. of acetic acid is sulphonated with 150 kg. concentrated sulfuric acid at a temperature of about 10° C. The reaction mixture is washed with twice the amount of concentrated Glauber salt solution in cold and mixed with soda liquor until there is a neutral reaction with Congo red.

*Example IV.*—100 kg. of the polymerization product obtained by heating for several hours of di-oxystearin acid to 150° C. are mixed with 70 kg. of butyric acid chloride and sulphonated with 100 kg. of concentrated sulfuric acid at a temperature of about 10° C. The reaction mixture is washed cold with twice the amount of Glauber salt solution, that is to say about 540 kg. and tested with soda liquor until there is a neutral reaction to Congo red.

It is to be understood that the invention is not limited to the employment of the quantities given by way of example. For example, the process may be carried out with substantially increased quantities of anhydrous organic acids, or their anhydrides or chlorides.

For the carrying out of the process, it is advantageous to employ glacial acetic acid, acetic acid anhydride, or acetyl chloride, the anhydride being chosen in the specific example given above.

I claim:—

1. The sulphonation of polymerized fatty material, including polymerized fats, oils, and fatty acids, consisting in treating said material with the sulphonating reagent and simultaneously with an anhydrous organic acid radical compound.

2. The sulphonation of polymerized fatty material, including polymerized fats, oils, and fatty acids, consisting in treating said material with the sulphonating reagent and simultaneously with an organic acid anhydride.

3. The sulphonation of polymerized fatty material, including polymerized fats, oils, and fatty acids, consisting in treating said material with the sulphonating reagent and simultanenously with an organic acid chloride.

4. The sulphonation of polymerized fatty material, including polymerized fats, oils, and fatty acids, consisting in treating said material with the sulphonating reagent and simultaneously with an acetic acid radical compound.

5. The sulphonation of polymerized fatty material, including polymerized fats, oils, and fatty acids, consisting in treating said material with the sulphonating reagent and simultaneously with acetic acid anhydride.

6. The sulphonation of polymerized fatty material, including polymerized fats, oils, and fatty acids, consisting in treating said material with the sulphonating reagent and simultaneously with acetyl chloride.

7. The sulphonation of polymerized fatty material including polymerized fats, oils, and fatty acids, consisting in treating a quantity of said material with the sulphonating reagent and simultaneously with an equal quantity by weight of an anhydrous organic acid radical compound.

Dr. HEINRICH BERTSCH.